US009580059B2

(12) United States Patent
Ohnemus et al.

(10) Patent No.: US 9,580,059 B2
(45) Date of Patent: Feb. 28, 2017

(54) HYBRID MODULE

(71) Applicant: Bayerische Motoren Werke Aktiengesellschaft, Munich (DE)

(72) Inventors: Ulrich Ohnemus, Hattenhofen (DE); Reinhard Simkovics, Freising (DE); Lothar Wolf, Holzkirchen (DE); Alexander Martin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 385 days.

(21) Appl. No.: 13/679,469

(22) Filed: Nov. 16, 2012

(65) Prior Publication Data
US 2013/0079193 A1 Mar. 28, 2013

Related U.S. Application Data

(63) Continuation of application No. PCT/EP2011/002176, filed on May 3, 2011.

(30) Foreign Application Priority Data

May 28, 2010 (DE) .................. 10 2010 029 435

(51) Int. Cl.
*B60W 10/02* (2006.01)
*B60K 6/40* (2007.10)
*B60K 6/48* (2007.10)

(52) U.S. Cl.
CPC .............. *B60W 10/02* (2013.01); *B60K 6/40* (2013.01); *B60K 6/48* (2013.01); *Y02T 10/6221* (2013.01); *Y10T 477/26* (2015.01)

(58) Field of Classification Search
CPC .................... B60W 10/02; B60K 6/40
See application file for complete search history.

(56) References Cited

U.S. PATENT DOCUMENTS

| 6,354,974 B1* | 3/2002 | Kozarekar | ............... B60K 6/26 180/65.21 |
| 6,935,450 B1* | 8/2005 | Tsuzuki | ................... B60K 6/26 180/65.26 |
| 7,527,573 B2 | 5/2009 | Lang et al. | |

(Continued)

FOREIGN PATENT DOCUMENTS

| CN | 1926001 A | 3/2007 |
| CN | 101451597 A | 6/2009 |

(Continued)

OTHER PUBLICATIONS

English translation of Chinese Office Action dated Jul. 7, 2014 (six (6) pages).

(Continued)

*Primary Examiner* — Derek D Knight
(74) *Attorney, Agent, or Firm* — Crowell & Moring LLP

(57) ABSTRACT

A hybrid module includes a housing, an input intended for rotationally coupling to an internal combustion engine, an output intended for rotationally coupling to an input of a gearbox, an electric machine arranged in the housing and having a stator and a rotor arranged within the stator radially, a separation clutch and a torsional vibration damper. The separation clutch and the torsional vibration damper are arranged within the rotor in both the radial and axial directions.

15 Claims, 2 Drawing Sheets

(56) References Cited

U.S. PATENT DOCUMENTS

| | | |
|---|---|---|
| 7,679,238 B2 | 3/2010 | Nomura et al. |
| 8,636,091 B2 | 1/2014 | Sanji et al. |
| 2002/0066607 A1* | 6/2002 | Levin .................. B60K 6/22 180/65.25 |
| 2003/0127262 A1 | 7/2003 | Noreikat et al. |
| 2006/0289209 A1* | 12/2006 | Grosspietsch et al. ...... 180/65.2 |
| 2009/0283344 A1* | 11/2009 | Arnold et al. ............. 180/65.22 |

FOREIGN PATENT DOCUMENTS

| | | |
|---|---|---|
| CN | 101678752 A | 3/2010 |
| DE | 100 18 926 A1 | 11/2000 |
| DE | 101 60 466 C1 | 6/2003 |
| DE | 103 19 880 A1 | 11/2004 |
| DE | 10 2006 056 512 A1 | 6/2008 |
| DE | 10 2007 060 165 A1 | 6/2009 |
| DE | 10 2008 021 685 A1 | 11/2009 |
| EP | 1 710 113 A1 | 10/2006 |

OTHER PUBLICATIONS

International Search Report dated Aug. 8, 2011 with English translation (four (4) pages).
German Search Report dated Jan. 25, 2012 with partial English translation (nine (9) pages).

\* cited by examiner

HYBRID MODULE

CROSS REFERENCE TO RELATED APPLICATIONS

This application is a continuation of PCT International Application No. PCT/EP2011/002176, filed May 3, 2011, which claims priority under 35 U.S.C. §119 from German Patent Application No. 10 2010 029 435.7, filed May 28, 2010, the entire disclosures of which are herein expressly incorporated by reference.

BACKGROUND AND SUMMARY OF THE INVENTION

The present invention relates to a hybrid module for use in vehicles.

A trend toward the "hybridizing" of conventional motor vehicle drives has been discernible for a relatively long time. Some manufacturers offer vehicles with an automatic gearbox, optionally with or without an upstream "hybrid module." For cost reasons, efforts are made to change or replace as few components as possible in the process of hybridizing.

It is an object of the invention to provide a hybrid module of simple and compact design by which an internal combustion engine can be coupled to a gearbox and with which a conventional drive train can be hybridized.

A hybrid module according to the invention comprises a housing, a rotary input, a rotary output, an electric machine arranged in the housing, as well as a separation clutch and a torsional vibration damper. The rotary input, identified hereinafter as the "input," is provided for rotationally coupling the hybrid module with an internal combustion engine or a crankshaft of an internal combustion engine. The rotary output, identified hereinafter as the "output," is provided for rotationally coupling the hybrid module to an input of a gearbox. The gearbox can be, for example, an automatic gearbox, a dual clutch gearbox, a manual gearbox, an automated manual gearbox or a gearbox of another type.

The electric machine arranged in the housing of the hybrid module has a stator fixed to the housing and a rotor which is rotatable relative to the stator. The rotor is designed and dimensioned such that the separation clutch and the torsional vibration damper can be arranged within the region enclosed by the rotor. The separation clutch and the torsional vibrator are therefore arranged (at least partially) "within" the rotor of the electric machine both in the radial direction and in the axial direction, thus enabling a very compact construction. For example, it can be provided that the separation clutch is arranged—seen from the input of the hybrid module in the direction of the output of the hybrid module—in front of the torsional vibration damper.

The separation clutch can be, in particular, a dry multi-plate friction clutch with a plurality of friction plate pairs. By installing a dry multi-plate friction clutch within the rotor of the electric machine and by integrating the torsional vibration damper in the space within the rotor of the electric machine, a relatively short structural length is achieved for the hybrid module. The multi-plate friction clutch can have two, three or more friction plate pairs.

According to one embodiment of the invention, the clutch has a non-actuated basic state in which the clutch is closed, i.e. so as to enable torque transmission. In order to open the clutch, a corresponding clutch hydraulic system can be provided, which has a hydrostatic actuator configured to match demand and able to be supplied with hydraulic energy.

In order to optimize the efficiency of the hybrid module, the friction plates of the clutch are fully separated in the open state. Therefore, in the open state of the clutch, the friction plates of the clutch do not contact one another. As a result, no friction heat is generated in the clutch in the open state thereof.

The input of the hydraulic module can be connected via the torsional vibration damper to the first friction plates of the clutch. The first friction plates can be radially inner friction plates (internal plates). The first friction plates cooperate with second friction plates which are arranged radially outwardly (external plates) in relation to the first friction plates. The second friction plates can be directly or indirectly connected to the rotor. The second friction plates therefore always rotate at the rotary speed of the rotor of the electric machine.

The first or second plates can be lined plates which are provided on both sides with a frictional coating. The lined plates are arranged to oppose friction partners made as steel or cast plates (second or first plates) by which, primarily, the heat that is generated is conducted away. Since steel or cast plates have a greater inertia than the lined plates, steel or cast plates are preferably arranged (for dynamic reasons) on the shaft which is static when the clutch is open.

The rotor of the electric machine can also be connected directly or indirectly to the output of the hybrid module, which is provided for rotationally coupling to the input of the gearbox.

According to another embodiment of the invention, the housing of the hybrid module is flanged, on an input side, to a crankcase of the internal combustion engine and, on an output side, to a housing of the gearbox. The housing of the hybrid module can be flanged directly or via an adaptor ring to the crankcase. Using an adaptor ring, the hybrid module can be combined with a variety of gearbox types.

According to another embodiment of the invention, the rotor of the electric machine is mounted in the housing of the hybrid module via sealed bearings in relation to the stator. The electric machine or the stator of the electric machine can be screwed onto the housing of the hybrid module or onto the adaptor ring as one "unit."

In order to lift the friction plates on an internal plate carrier or external plate carrier, nodular washers or tangential leaf springs can be provided.

In order to actuate the separation clutch, as previously mentioned, a hydraulic system is provided. The hydraulic system is supplied with hydraulic pressure by a hydraulic pump. The hydraulic pump is driven by an electric motor. The electric motor used to drive the hydraulic pump can also be used as a drive motor of a gearbox oil pump of the gearbox connected to the hybrid module. The concerned electric motor, the hydraulic pump and the gearbox oil pump can be arranged outside the housing of the hybrid module and outside the housing of the gearbox.

The invention achieves the following advantages:

(1) A conventional drive train can be hybridized with the hybrid module according to the invention, the "basic gearbox" remaining, as far as possible, unaltered.

(2) The system for rotary oscillation reduction arranged on the gearbox input side with a conventional drive train is retained in principle, but is integrated into the hybrid module.

(3) The hybrid module can be combined with any gearboxes.

Other objects, advantages and novel features of the present invention will become apparent from the following

DETAILED DESCRIPTION OF THE DRAWINGS

Figure 1:
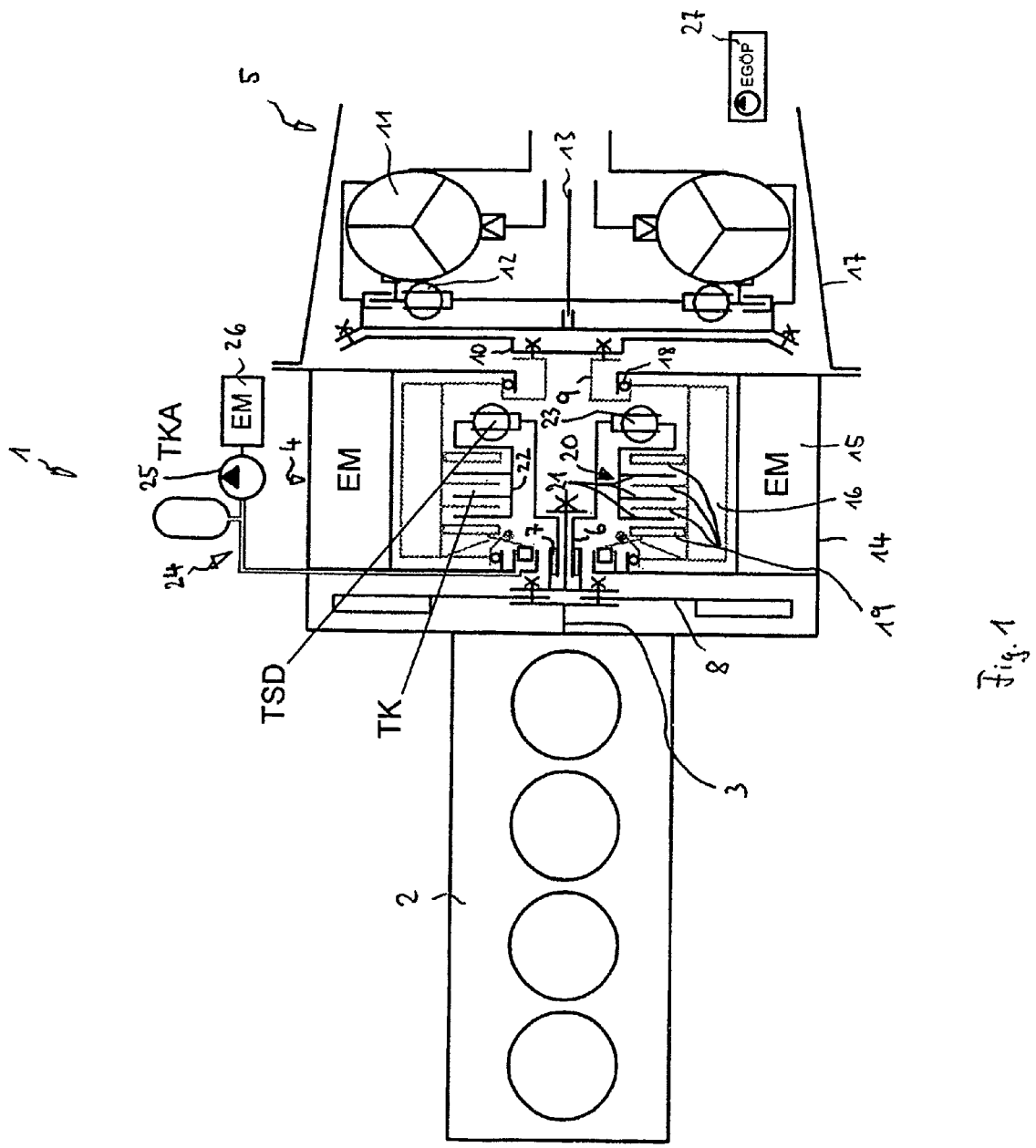
FIG. 1 is a schematic representation of the underlying principle in accordance with an exemplary embodiment of the invention.

FIG. 1 shows a drive train 1 for a vehicle. The drive train 1 has an internal combustion engine 2, the crankshaft 3 of which is rotationally coupled to a hybrid module 4 arranged between the internal combustion engine 2 and a gearbox 5 which, in this case, is an automatic gearbox.

An input 6 of the hybrid module 4 is rotationally coupled via longitudinally arranged teeth 7 and a flywheel 8 to the crankshaft 3 of the internal combustion engine 2. An output 9 of the hybrid module 4 is connected to an input 10 of the automatic gearbox 5. The input 10 of the automatic gearbox 5 is, in turn, connected via a torque converter 11 and a rotary oscillation damper 12 to a drive shaft 13 of the automatic gearbox 5.

The hybrid module 4 has a housing 14 in which an electric machine EM, having a stator 15 firmly connected to the housing 14, and a rotor 16 which is rotatable relative thereto, is arranged.

As FIG. 1 shows, the housing 14 of the hybrid module 4 is flanged onto a housing 17 of the automatic gearbox 5. The stator 15 can be connected to the housing 17, for example, via an adaptor ring which can be arranged between the housing 14 and the housing 17.

The rotor 16 of the electric machine is connected to the output 9 of the hybrid module and is rotatably mounted in the housing 14 by way of a bearing 18.

Also arranged at a radially inner side of the rotor 16 are external plates 19 of a dry multi-disk coupling 20, which functions as a separation clutch. Internal plates 21, which are arranged on a plate support 22, are associated with the external plates 19. The plate support 22 is coupled, via a torsional vibration damper 23, to the input 6 of the hybrid module.

The separation clutch 20 has a non-actuated basic state in which the clutch is closed and enables torque transmission. In order to open the separation clutch 20, a clutch hydraulic system 24 is provided, which is shown here only schematically in a very simplified fashion. The clutch hydraulic system 24 is supplied with hydraulic pressure by a hydraulic pump 25 powered by an electric motor 26.

With the separation clutch 20 open, the external and internal friction plates 19, 21 are completely separated from one another in order to substantially prevent frictional losses. With the separation clutch 20 open, the torque connection between the internal combustion engine 2 and the gearbox input 10 is interrupted.

With the separation clutch 20 closed, torque can be transmitted from the crankshaft 3 to the input 6 and via the separation clutch 20 and the rotor 16 to the output 9, and from the output 9 to the input 10 of the gearbox 5. In addition, the torque supplied by the internal combustion engine 2 can be overlaid with a torque from the electric machine (electromotor drive torque or generator braking torque).

For the sake of completeness, a gearbox oil pump 27 is integrated into the automatic gearbox 5 of the exemplary embodiment shown in FIG. 1.

Figure 2:
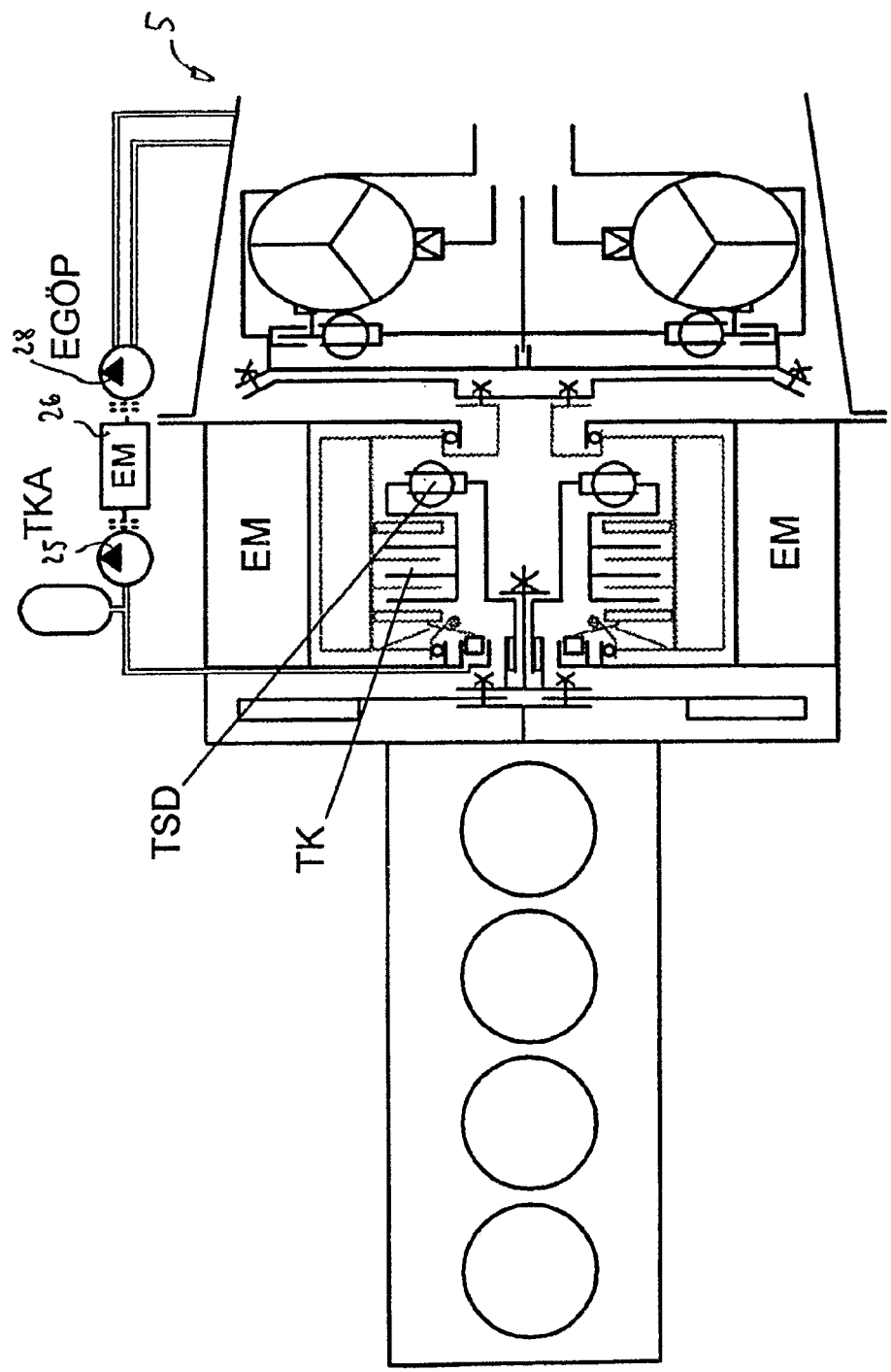
FIG. 2 is a variant of the exemplary embodiment of FIG. 1.

FIG. 2 shows a variant of the exemplary embodiment of FIG. 1. In contrast to FIG. 1, in addition to the hydraulic pump 25, the electric motor 26 here also drives a gearbox oil pump 28, which here is arranged outside the automatic gearbox 5. The electrically driven gearbox oil pump 28 is intended to replace or support an existing mechanical gearbox oil pump of the automatic gearbox at low input rotary speeds (or at an input rotary speed of zero).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid module, comprising:
    a housing;
    an input for rotationally coupling to an internal combustion engine;
    an output for rotationally coupling to an input of a gearbox;
    an electric machine comprising a stator and a rotor, the rotor being arranged radially inward of the stator;
    a dry separation clutch;
    a torsional vibration damper, wherein
        the electric machine is arranged within the housing, and
        the dry separation clutch and the torsional vibration damper are enclosed directly by the rotor in both a radial direction and an axial direction thereof, and friction plates of the dry separation clutch are directly connected to the rotor, and
        a first end of the torsional vibration damper is connected to the input that rotationally couples the hybrid module to the internal combustion engine.

2. The hybrid module according to claim 1, wherein the separation clutch comprises a plurality of friction plate pairs.

3. The hybrid module according to claim 1, wherein the separation clutch is operatively configured to be closed in a non-actuated state.

4. The hybrid module according to claim 2, wherein the separation clutch is operatively configured to be closed in a non-actuated state.

5. The hybrid module according to claim 1, further comprising:
    a hydraulic system operatively configured for opening the separation clutch.

6. The hybrid module according to claim 2, further comprising:
    a hydraulic system operatively configured for opening the separation clutch.

7. The hybrid module according to claim 3, further comprising:
    a hydraulic system operatively configured for opening the separation clutch.

8. The hybrid module according to claim 2, wherein the separation clutch is operatively designed to fully separate friction plates of the friction plate pairs in an open state of the separation clutch.

9. The hybrid module according to claim 3, wherein the separation clutch is operatively designed to fully separate friction plates of the friction plate pairs in an open state of the separation clutch.

10. The hybrid module according to claim 5, wherein the separation clutch is operatively designed to fully separate friction plates of the friction plate pairs in an open state of the separation clutch.

11. The hybrid module according to claim 1, wherein the input of the hybrid module is connected via the torsional vibration damper to first friction plates of the separation clutch.

12. The hybrid module according to claim 1, wherein two friction plates of the separation clutch are connected to the rotor of the electric machine.

13. The hybrid module according to claim 1, wherein the housing is configured to flangedly connect on an input side to a crankcase of the internal combustion engine and on an output side to a housing of the gearbox.

14. The hybrid module according to claim 1, wherein the stator is arranged radially outward from an external wall of the internal combustion engine.

15. A hybrid module for use in a vehicle equipped with an internal combustion engine and a gearbox, the hybrid module comprising:
- a housing operatively configured to be arranged between the internal combustion engine and the gearbox;
- an electric machine comprising a stator and a rotor, the rotor being arranged radially inward of the stator;
- a dry separation clutch;
- a torsional vibration damper, wherein
  - the electric machine comprising the stator and the rotor is arranged within the housing, and the dry separation clutch and the torsional vibration damper are enclosed directly by the rotor of the electric machine in both a radial and an axial direction thereof, and friction plates of the dry separation clutch are directly connected to the rotor, and
- a first end of the torsional vibration damper is connected to an input that rotationally couples the hybrid module to the internal combustion engine.

* * * * *